Jan. 17, 1967  A. J. REIFEL  3,298,321
FUEL BOOSTER PUMP
Filed Dec. 31, 1964  2 Sheets-Sheet 1
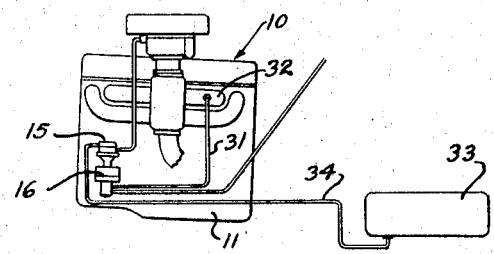
FIG. I.
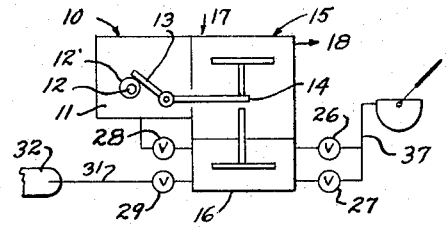
FIG. 2.
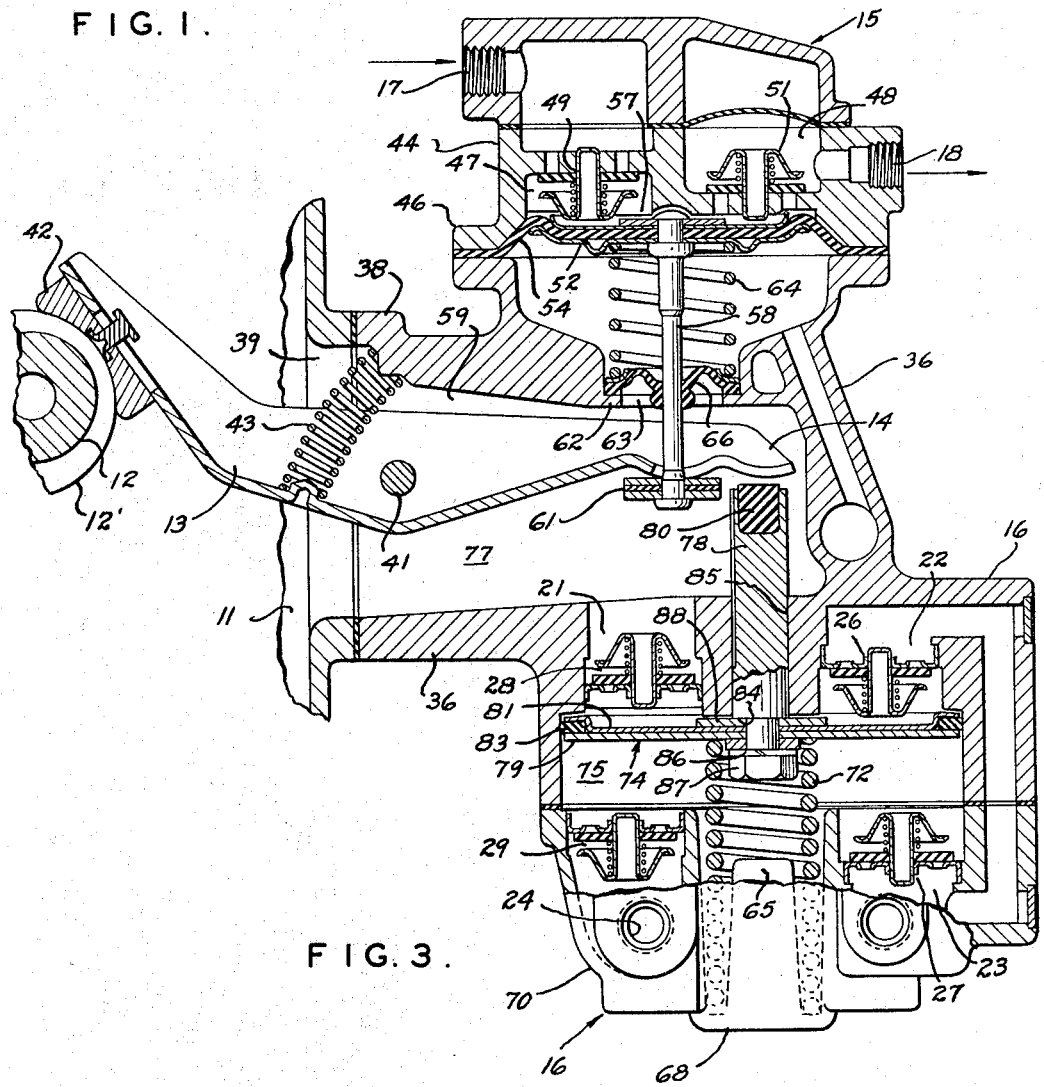
FIG. 3.
INVENTOR.
ALLAN J. REIFEL
BY
ATTORNEY

United States Patent Office 3,298,321
Patented Jan. 17, 1967

3,298,321
FUEL BOOSTER PUMP
Allan J. Reifel, Breckenridge, Mo., assignor to ACF Industries, Incorporated, New York, N.Y., a corporation of New Jersey
Filed Dec. 31, 1964, Ser. No. 422,585
6 Claims. (Cl. 103—153)

The invention relates to a pump, it relates in particular to a pump for use in an automotive vacuum system.

Many automotive systems embody together with a main power source, a supplemental power source to operate accessory equipment such as windshield wipers and the like. It has been found highly practical to operate the secondary system as a vacuum system, off the primary power source. Thus, in many automobiles, trucks, and other powered vehicles, the secondary vacuum system operates directly from the main engine and usually associated with the engine intake manifold.

Normally, intake manifold pressure is substantially below atmospheric, and if transmitted to accessory motors such as the windshield wipers, will satisfactorily operate the latter. However, under varying engine conditions an excessive load may be put on the engine as while climbing a steep grade. At such time there is a decrease in engine intake manifold pressure and consequently a slowing or even a stopping of the accessories operated by the vacuum system. While a temporary or even a sustained stoppage of the windshield wipers on an automobile or truck may not constitute a great inconvenience, at times such an interruption could be critical due to the loss or impairment of the driver's vision.

The problem of maintaining sufficient vacuum at wiper motors has been at least partially overcome by provision of a booster pump or the like which will be actuated to supplement the main vacuum system only as needed. A booster of this type can be actuated in several different ways, for example directly from the engine cam shaft. As illustrated in FIGURE 3, the booster pump shown is actuated directly by a spring biased pivot arm connected to the engine fuel pump and operatively engaging the engine cam shaft.

In the fuel pump arrangement shown in FIGURE 1, the booster unit is operably connected to a lever arm disposed in the engine crankcase. Since the crankcase is normally subjected to oil splash, a certain amount of lubricating oil will pass downwardly along the booster piston rod, and thence to the piston itself.

At least one discharge port of the booster pump is connected to the engine intake manifold. Thus, any lubricating oil entering the booster and being forced through the discharge port into the engine intake manifold, will be subsequently delivered in the air fuel mixture to the engine combustion chambers. It is readily seen, therefore, that with a sufficient passage of oil into the booster system, the engine will eventually realize a substantial loss of lubricant, and subsequently reflect the disadvantage of such oil loss in operating inefficiency.

In overcoming the above noted disadvantages concomitant with a vacuum operation, the present invention provides a novel arrangement in an automotive vacuum system comprising a vacuum booster pump cooperative with the engine fuel pump. Both of these units are operably connected to a drive member.

The booster pump is communicated with the engine crankcase to receive a certain amount of lubricant and provide lubrication for the reciprocably carried booster piston rod. The booster piston is slidably carried in a cylinder within the booster pump casing. The latter is provided with suitable valve inlet and outlet ports for passing air therethrough to maintain a desired vacuum at windshield wiper motors or other accessories connected to a vacuum source.

The booster piston is spring biased and actuated intermittently in response to engine manifold pressure such that the booster supplements the main system only at times as the engine manifold vacuum drop off. To avoid loss of excessive amounts of oil through the booster unit, the booster piston is provided with a novel circumferencial seal ring which is positioned to slidingly contact adjacent walls of the booster piston cylinder. Said ring thus prevents or precludes flow of oil downwardly along the cylinder walls which would otherwise be passed to the engine intake manifold.

Thus, under normal operations, with the booster pump actuated into the system, the piston peripheral seal will provide a flexible, yet sufficiently rigid wiping member to permit a minor amount of lubricant to enter the booster pump and yet prevent the discharge of such lubricant to the engine intake manifold.

It is, therefore, an object of the invention to provide an improved vacuum system for operating vacuum actuated equipment.

Another object is to provide an improved pump in a vacuum system operated by an engine, to supply the necessary degree of vacuum at accessories operated thereby.

Still another object is to provide an improved pump cooperative with an automotive engine and being lubricated by oil from said engine, said pump including means for retaining the oil in the engine crankcase.

Another object of the invention is to provide a pump having seal means carried on the pump piston and being adapted to minimize loss of engine oil due to passage of the oil from the crankcase of the engine to the engine intake manifold.

Still another object of the invention is to provide a double acting vacuum pump, communicated to an internal combustion engine, said pump being further connected to discharge to the engine crankcase and to the engine intake manifold for supplementing a vacuum system, and means in said pump for directing lubricant to said crankcase rather than to the intake manifold.

Other objects of the invention will become clear to those skilled in the art from the following description made in conjunction with the drawings appended hereto in which:

FIGURE 1 illustrates an internal engine connected to a fuel tank, and having a vacuum system of the type hereinafter cooperative with the engine.

FIGURE 2 is a schematic diagram of the vacuum system referred to above.

FIGURE 3 is an enlarged view in cross section of fuel pump and vacuum booster embodying the present invention.

Figure 4:
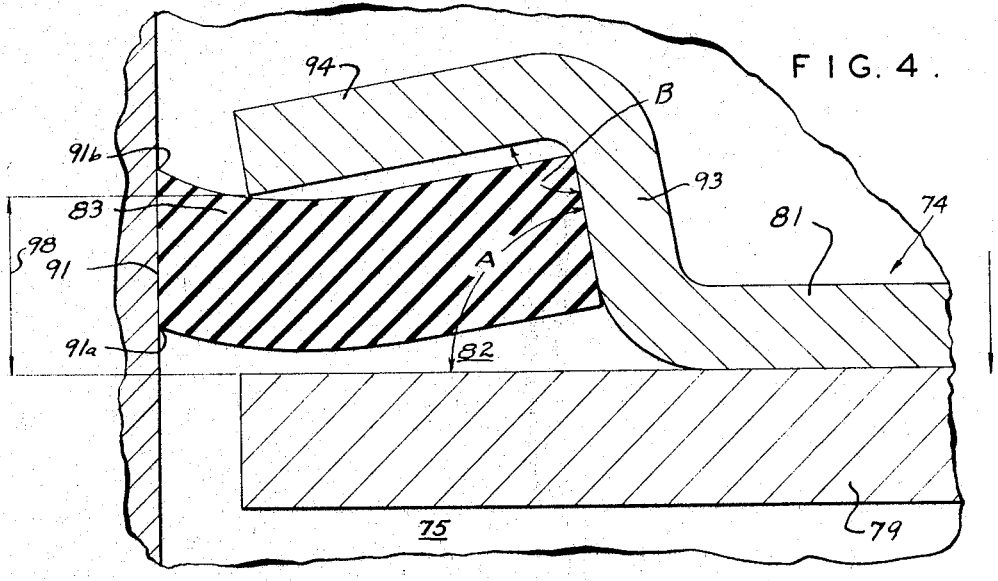
FIGURE 4 is a segmentary view on an enlarged scale and in cross section illustrating the piston seal ring of the invention with the piston moving downwardly.

Referring to the drawings, a vacuum system of the type contemplated is shown in FIGURES 1 and 2. The system is combined with an internal combustion engine 10 having a crankcase 11 provided with suitable means for lubricating engine parts from an oil reservoir in the crankcase. Such parts include a cam shaft 12 which is connected to a pivotally mounted lever arm 13 having the remote end 14 thereof positioned to reciprocably move in a substantially vertical arcuate path for actuating the system fuel pump 15, and the vacuum booster pump 16.

Referring to FIGURES 2 and 3, fuel pump 15 includes a fuel inlet 17 and outlet 18, and is mounted substantially vertically above the booster pump. The latter includes a plurality of valve openings 21, 22, 23, and 24. Inlets 22 and 23 constitute inlet suction openings and are communicated through check valves 26 and 27 respectively to vacuum actuated accessories which will be hereinafter referred to as the windshield wiper motors.

The discharge side of the booster pump includes valve outlets 21 and 24 having check valves 28 and 29 therein, at least one of which valve outlets, i.e. 21 is communicated with engine crankcase 11. The other opening 24 is communicated as shown in FIGURE 1, by way of line 31 with the engine intake manifold 32. Thus, during those periods when the intake manifold vacuum decreases, booster pump 16 will be spring urged into contact with the actuating lever 14 thereby supplementing the vacuum system until such time as the intake manifold pressure becomes altered to provide the desired vacuum at the windshield wiper motors.

Referring to FIGURES 2 and 3, the combination fuel pump 15 and booster unit 16 is supportedly dependent from one side of the engine crankcase 11, and communicated therewith. Suction inlet 17 of fuel pump 15 is communicated through elongated conduit or tubing 34 to the fuel tank 33 holding a supply of gasoline or other liquid fuel.

The vacuum booster unit 16 is connected directly to the fuel pump casing and also depends from the engine side wall, said booster as shown in FIGURE 2, includes at least one line 31 connected through a valved outlet 24 to engine intake manifold 32, and another line 37 connected as shown to the vacuum driven motor.

Referring to FIGURE 3, the enlarged cross-sectional view of the booster pump combination includes elongated casing 36 having a flanged inlet 38 which connects to a corresponding opening 29 in the engine side wall to afford access to crankcase 11. Elongated casing 36 is open at upper and lower opposed ends and includes at the upper portion, the fuel pump 15 mechanism and in the lower portion the booster pump arrangement 16.

The internal combustion engine is represented schematically in FIGURE 2 by cam shaft 12 which in the normal manner, is rotatably driven by positive connection with the crankshaft 12. At least one cam 12' is fixedly mounted to the cam shaft and is rotatably driven at a rate proportioned to engine speed. Elongated lever arm 13 is pivotally carried within casing 36 by a pin 41 mounted transversely of the inlet 39. Lever arm 13 includes a shoe 42 at one end slidably engaging the outer surface of cam 12'.

Cooperation of the lever arm 13 on cam 12' is a well known mechanical combination which results in the lever arm being pivotally rocked about pin 41 and providing a vertical arcuate motion at the remote end 14 so long as the engine is in motion. Spring 43 positioned at a retainer formed on lever arm 13 engages a wall of the casing 36 to normally bias the lever arm into rubbing contact with the cam surface.

The upper end of casing 36 receives the pump generally designated as 15, which is formed basically of the pump body 44, having a peripheral flange 46. Body 44 is bolted at the flange 46 to casing 36 positioning diaphragm 54 there between. Body 44 comprises at least a pair of separate cavities 47 and 48 having check valve assemblies 49 and 51 in each thereof.

Diaphragm assembly 52 includes flexible diaphragm 54 disposed across the cavity formed in pump body 44 thereby defining a pumping chamber 57. Push rod 58 is connected to diaphragm 54, having one end of the push rod extending downwardly into central opening 59. The lower end of push rod 58 is operably connected to the remote end of lever arm 14, having a slide means 61 holding said members in engagement whereby rocking motion of the lever arm may be transmitted to the push rod 58 for actuating diaphragm 54.

The cavity formed in the upper part of casing 36 includes a peripheral shoulder 62 defining an opening 63 for registry of the push rod 58. Compression spring 64 is disposed about the push rod 58, engaging peripheral shoulder 62 for urging the diaphragm 54 into a normally upward position. Seal member 66 carried on shoulder 62 is urged into contact therewith by compression spring 64.

The lower part of casing 36 includes a portion defining a central cavity 77 having a plurality of openings therein. A header 70 connected to lower casing 36 forms a closure and includes check valve assemblies 27 and 29 regulating the passage of air therethrough.

In effect the booster pump 16 shown is a double acting unit whereby at each movement of the pump piston in a vertical direction, an amount of air is moved through the pump thereby establishing the required vacuum at the wiper motor.

Header 70 includes a retainer hub 68 having a central guide portion 65. A spring member 72 carried in hub 68 is urged into contact with the pump piston 74 as will be hereinafter noted.

Casing 36 includes a cavity defining a cylinder 75. The cylinder upper wall includes an elongated opening 35 providing a sliding fit for the piston push rod 78. The upper part of push rod 78 is disposed adjacent the remote end 14 of the lever arm 13, said push rod including on its upper end a resilient pad 80 which forms a contacting surface for the lever arm end 14.

Figure 5:
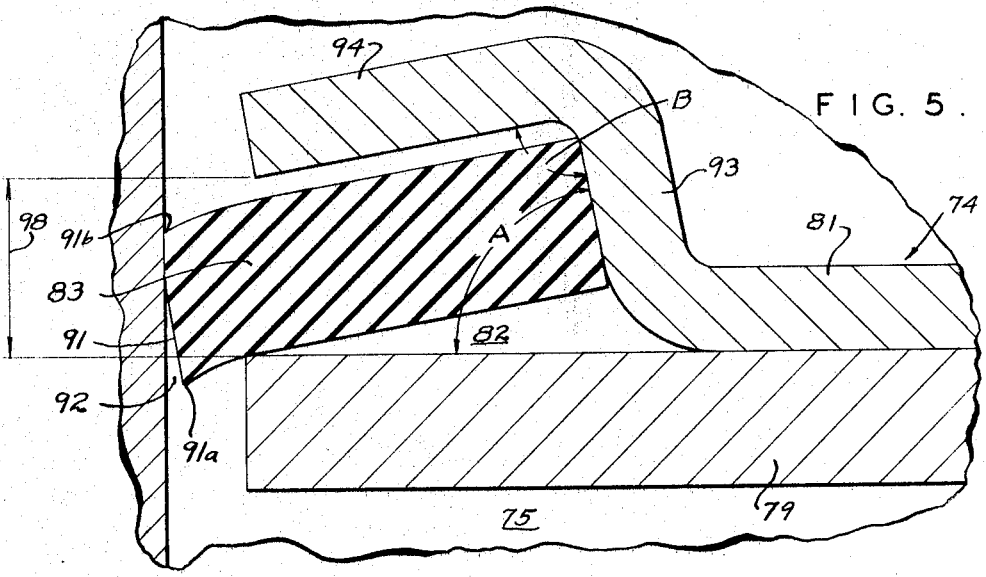
FIGURE 5 is similar to FIGURE 4 showing the piston when moving upwardly.

Piston assembly 74 carried in cylinder 75 includes a first or lower plate 79 having a central opening. A second plate 81 carried on said first plate is flared at the outer end to define as shown in FIGURES 4 and 5, a peripheral groove 82 at the piston edge for receiving a circular seal member 83.

Push rod 78 slidably carried in wall opening 85 includes a necked portion terminating at shoulder 84. Said necked portion is disposed in registry with the respective opening in the first and second plate 79 and 81, the remote end of said necked portion being threaded to accommodate a lock washer 86 and nut 87 which fasten the piston and push rod into a unitary member. A washer 88 carried at the opposed side of the piston surface completes the piston assembly.

As mentioned herein, spring member 72 carried in the hub 68 is compressibly disposed in contact with the lower surface of the piston assembly thereby normally urging the latter upward and into contact with lever arm 13.

*Operation*

Under normal operating circumstances, and referring to FIGURES 1 and 2, reduced pressure at engine inlet manifold 32 is communicated directly to the windshield wiper motors through the booster pump 16 including valves 29 and 27 respectively. Thus, each inlet and outlet valve will be maintained in an open position by the reduced pressure to maintain a satisfactory vacuum at the windshield wiper motor. The resulting reduced pressure in the booster pump piston lower surface will cause the latter to withdraw into a downward position. In the latter position, piston push rod 78 is withdrawn sufficiently from contacting the lever arm 14 such that the booster pump is in effect removed from operation.

As vacuum pressure at inlet manifold 32 decreases as when the vehicle comes to a steep grade or sudden climb whereby the vacuum at inlet manifold 32 will be reduced, the vacuum at accessory motors will also be decreased as will be pressure in the line communicating said respective members. Thus, with the reduction of vacuum, at the pump piston lower surface, the latter will be urged upwardly by the force of spring 72 thereby bringing the upper end of push rod 78 into engagement with the rocker arm 13.

Thereafter, the booster piston will be reciprocated in accordance with the speed of the engine and in response to the movement of the rocker arm 13, thereby maintaining sufficient vacuum at windshield wiper motors.

When the booster unit is inoperative that is when piston 78 is withdrawn from its upper position, lubricating oil from the crankcase 11 will flow downwardly along the sides of the push rod 78 and passage 85 to form a pool at the piston upper surface. Such information is not objectionable nor will it impair operation of the booster pump. However, when the booster is again urged into action by a decrease in pressure as therein mentioned, the piston will again be slidably reciprocated within cylinder. Oil thus collected at the piston is aspirated through opening 21.

During steady operation of booster 16, lacking the present oil seal arrangement, and with an accumulation of oil on the piston upper surface, each downward movement of the piston rod 58 would result in oil being swept along the cylinder walls and a part thereof being passed to intake manifold 32. However, and referring to FIGURES 4 and 5, during movement of the piston, seal ring 83 will assume the dispositions as shown. During the down stroke, as shown in FIGURE 4, the entire contact edge of seal member 83 is held in sliding engagement with the adjacent piston wall. During the upstroke as shown in FIGURE 5, lower rim 91a of the ring contact edge is spaced from the cylinder walls thereby defining a wedge-like cavity 92 to the rear of advancing rim 91b.

To overcome the oil pumping action previously found in the seal in apparatus of the type contemplated, the present invention provides a unique form of seal arrangement at the piston wall such that under normal reciprocating action, oil pumping action due to the seal reversal is eliminated. Rather the oil is permitted to flow downwardly along the cylinder wall during the downward stroke and thereafter is carried upwardly along the cylinder wall without a substantial amount thereof passing the seal member 83 to enter the lower part of the cylinder.

Referring again to FIGURES 4 and 5, piston assembly 74 includes lower plate 79 and upper plate member 81, arranged to define an annular cavity 82 into which the seal member 83 is positioned and retained.

Both upper and lower plates have a diameter slightly less than the diameter of the cylinder 75. The plates are abuttingly positioned, being assembled as previously noted by locking means at the end of rod 78.

In one embodiment of the invention; plate 81 is provided with an upstanding rim 93 forming an angle A of about 75° to 85° with the horizontal. Radially extending lip 94 depends outwardly from the rim 93 upper edge, forming an angle B of approximately 90° with the rim. The outer edge of lip 94 terminates approximately adjacent the peripheral edge of the lower plate 79, thereby defining annular opening 98 at the piston outer edge.

Seal ring 83 positioned in cavity 82 is preferably in the form of a substantially flat, resilient member made of a deformable material such as rubber or the like. Said ring 83 includes parallel upper and lower surfaces connected by a radial contact surface 91 disposed outwardly of the piston edge, and an inner surface disposed in abutment with the inner wall of rim 93. Ring 83 is characterized by an outside diameter slightly greater than the diameter of the cylinder 75 within which the piston 74 is slidably carried. Ring 83 is further positioned with contact edge 91 formed to be slidably and moveably carried in the cylinder 75, thus forming a resilient annular seal. Ring 83 is generaly planar, when in an unstrained position, having an inside diameter slightly less than the diameter of the rim 93.

As shown in FIGURES 4 and 5, with ring 83 held in place in cavity 92, the inner edge of ring 83 is in abutment with the outer surface of rim 93. The ring when so positioned is strained from a normally flat position to fit against the peripheral rim. Thus, the normally flat attitude of the ring will be disrupted to assume the general configuration shown in the FIGURES 4 and 5 which can be described geometrically as a truncated conical configuration.

The position of the ring when assembled within the groove is such that preferably the contact edge 91 forms an angle of approximately 15° to 30° with the longitudinal axis of the piston.

In the assembled position, as piston 74 is moved into the downward position within the cylinder 75, ring 83 will assume the form shown in FIGURE 4. With the lower edge 91a leading, seal ring 83 will present a generally flat surface in abutment with the adjacent cylinder wall 75, with any oil accumulation at the upper side thereof.

As the direction of the piston 74 is reversed in response to a reversal in the rocker arm 13, frictional force between the cylinder wall and the seal ring 83 will cause the latter to re-adjust itself by altering the disposition of the respective upper and lower contact edges 91a and 91b. Thus, the upper edge 91b remains in contact with the adjacent cylinder wall, whereas the lower edge 91a as shown in the FIGURE 5 is urged away from the wall to define a wiping member.

During each pumping cycle, edge 91 is continuously flexed into contact with the cylinder wall, thereby forming a barrier or at least a substantial barrier to the passage of oil therethrough. There may, of course, be a slight degree of oil leakage past the annular seal, said leakage, however, is advantageous for lubricating purposes to promote a free pasage of the seal ring along the cylinder wall.

Referring to the FIGURES 4 and 5, cavity 82 is generally elongated in cross-section, having peripheral opening 98 approximating the thickness of the seal ring 83. Thus, at opening 98, pressure may be exerted against the upper and lower surfaces of the ring, for positioning the latter, however it is preferred that there be a loose engagement between these members to permit a ready reversal of the position of the ring edge 91 in response to a reversal in the direction of piston travel.

Again referring to the FIGURES 4 and 5, ring 83 is shown within the peripheral cavity 82 with no support other than a frictional engagement against upright rim 93 due to the elasticity of the resilient seal material. Additional support can be provided within the cavity to maintain ring 83 in abutment with the lower surface of the rim edge. Such additional support may take the form of a platform at the upper surface of the plate 79, alternately, the lower plate 79 may be shaped to conform to the space defined by the lower edge of rim 94 and the upper edge of the plate 79. It is also feasible in accordance with the invention that the cross-sectional shape of the ring 83 may be so adapted to conform substantially radial outward force against the seal ring 83, thereby urging the latter into a deformed position such that peripheral edge 91 extending beyond the edge of the piston is free to reverse its position upon reversal in direction of travel of the piston 74.

It is understood that the foregoing description is exemplary of the novel piston seal arrangement and that certain changes and modifications can be made without departing from the spirit and scope of the invention.

I claim:
1. The combination in a composite fuel and vacuum pump adapted to cooperate with the crankcase of an oil lubricated internal combustion engine, said vacuum pump receiving lubricating oil from said crankcase and including;
 (A) a cylinder,
 (B) a piston reciprocably received in said cylinder,
 (C) inlet and outlet valves communicated with the cylinder and being operable to regulate passage of fluid therethrough, the improvement therein of;
 (D) a resilient seal member carried on said piston and having a contact face disposed contiguous with the cylinder wall for slidingly engaging the latter and forming a peripheral fluid tight joint therewith, (E) said contact face including upper and lower edges, (F) said resilient member being retained in said piston in a generally frusto-conical configuration to maintain said contact face in engagement with said cylinder wall during reciprocatory movement of the piston, whereby during said downward stroke, both upper and lower edges of said contact face are in sliding engagement with said cylinder wall and during said upward stroke said contact face will self-adjust to position only the upper edge thereof in engagement with the wall, said lower edge being spaced therefrom whereby, at the lower end of the downward stroke the position of said contact face with respect to said cylinder wall may adjust in response to movement of the piston on the upward stroke without permitting passage of lubricating oil between said cylinder wall and said contact face.

2. In the combination as defined in claim 1, wherein said piston includes a circular rim positioned inwardly of the piston edge, said seal member includes a central opening being smaller in diameter than the diameter of the said circular rim, whereby when said opening is registered against the rim, the seal under radial force will deform and assume said frusto-conical configuration.

3. In the combination as defined in claim 1 wherein said seal member when in the unmounted position includes a disc-like ring having a generally cylindrical surface defining the peripheral contact face.

4. In the combination as defined in claim 1 wherein said piston includes a lower plate, an upper plate having a circular rim formed thereon, and a lip extending outwardly from said rim to form with the lower plate a groove for receiving and positioning said seal member.

5. In the combination as defined in claim 4 wherein said rim is disposed at an angle of approximately 15 to 30 degrees with respect to the piston's longitudinal axis.

6. In the combination as defined in claim 4 wherein said lip extending from said rim forms an angle of between 15 and 30 degrees with the plane extending normal to the piston longitudinal axis.

References Cited by the Examiner

UNITED STATES PATENTS

| | | | |
|---|---|---|---|
| 3,031,240 | 4/1962 | Olsen | 277—173 |
| 3,134,332 | 5/1964 | Nelson | 103—150 |
| 3,163,355 | 12/1964 | Korte | 103—9 |

FOREIGN PATENTS

| | | |
|---|---|---|
| 478,017 | 10/1951 | Canada. |
| 1,267,732 | 6/1961 | France. |
| 474,055 | 3/1937 | Great Britain. |

DONLEY J. STOCKING, *Primary Examiner.*

MARK NEWMAN, *Examiner.*

W. L. FREEH, *Assistant Examiner.*